Dec. 1, 1959  R. W. CANFIELD  2,914,799
PLASTIC BOTTLE BLOWING APPARATUS
Filed Jan. 5, 1954  10 Sheets-Sheet 1

INVENTOR
ROBERT W. CANFIELD
BY Bates + Willard
ATTORNEYS

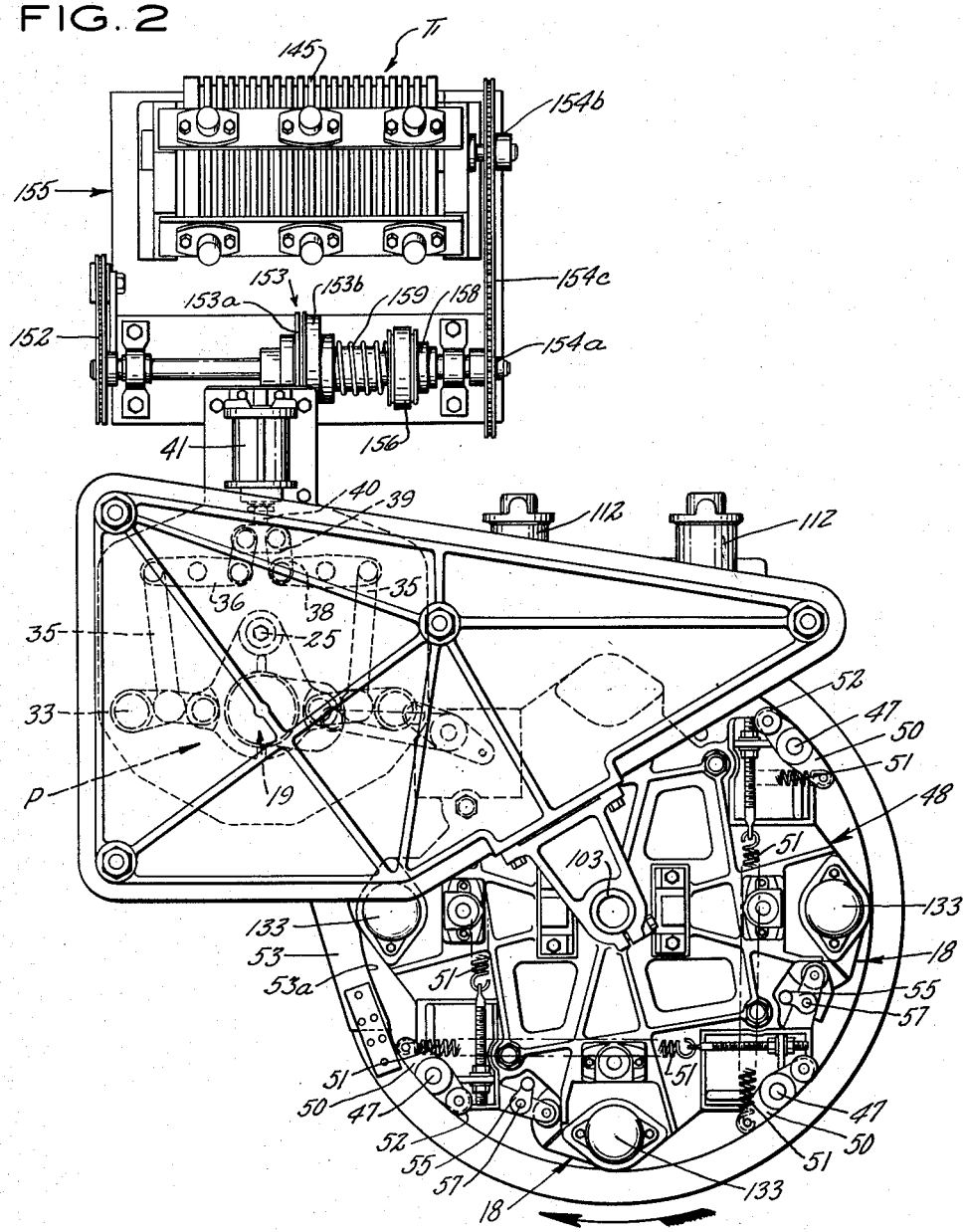

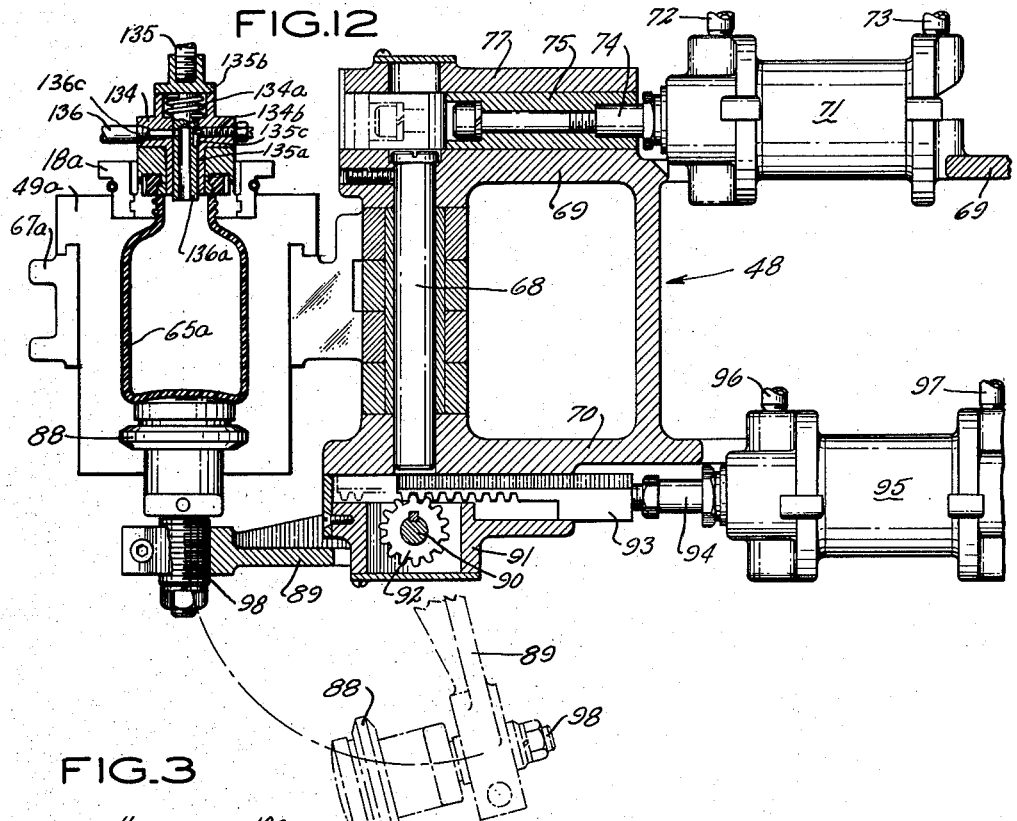
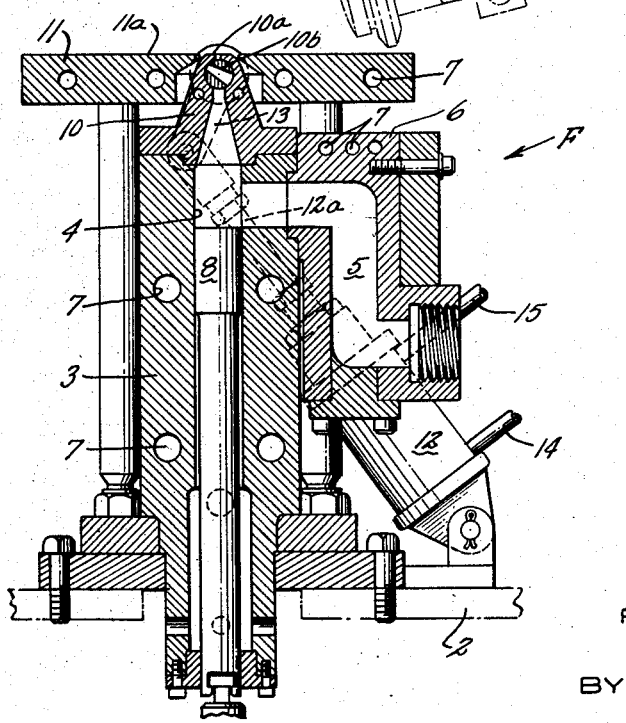

Dec. 1, 1959  R. W. CANFIELD  2,914,799
PLASTIC BOTTLE BLOWING APPARATUS
Filed Jan. 5, 1954  10 Sheets-Sheet 4

INVENTOR
ROBERT W. CANFIELD
BY Bates & Willard
ATTORNEYS

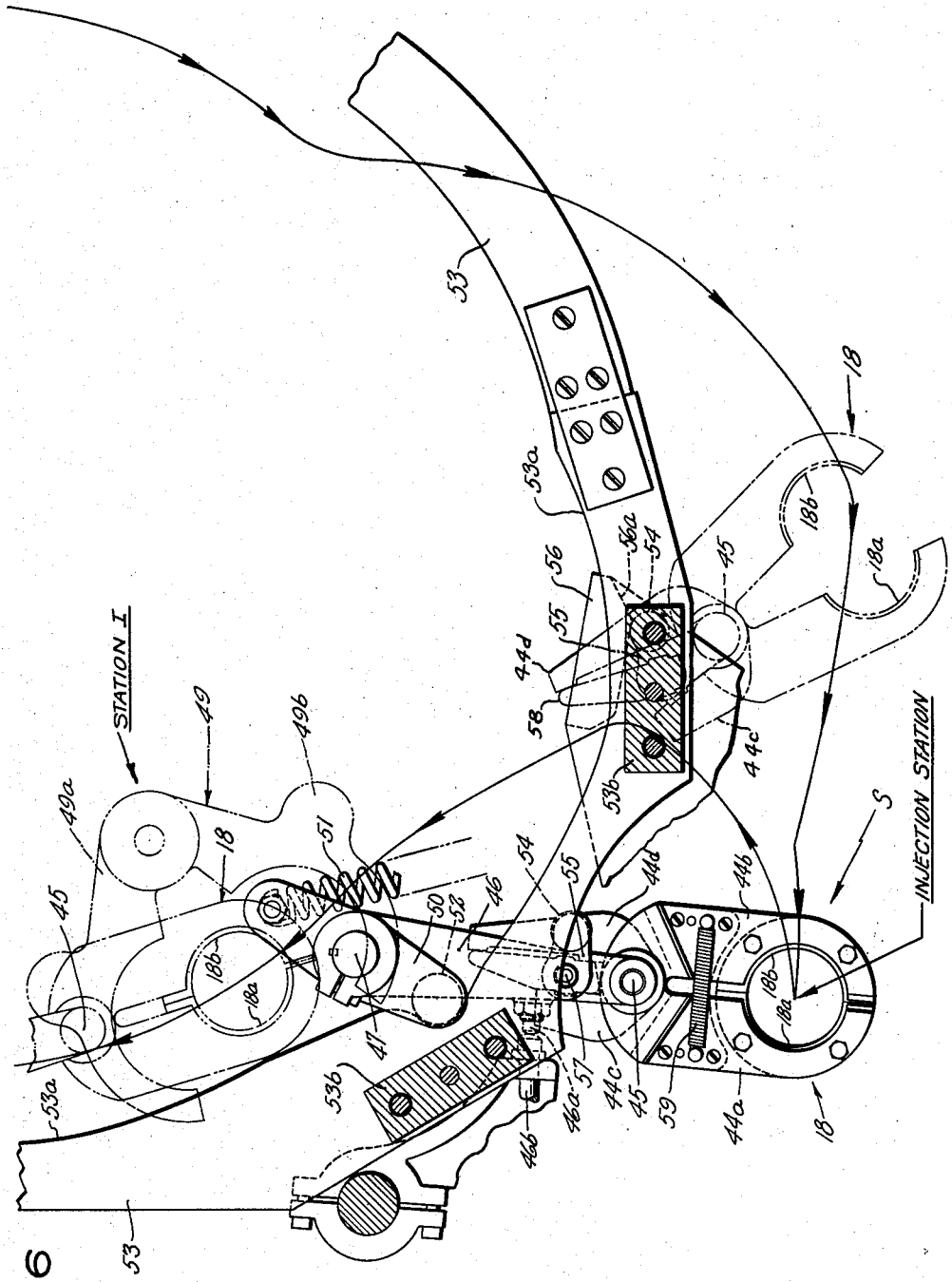

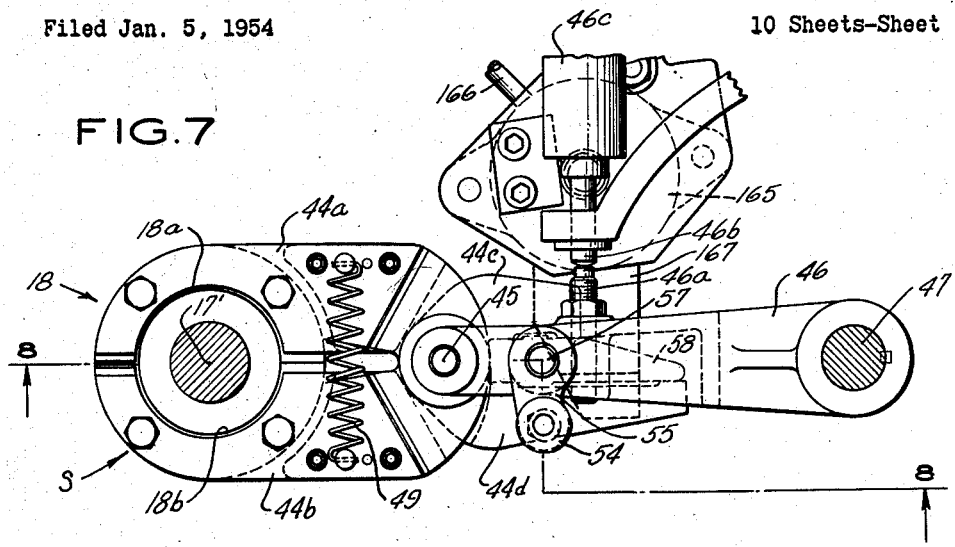
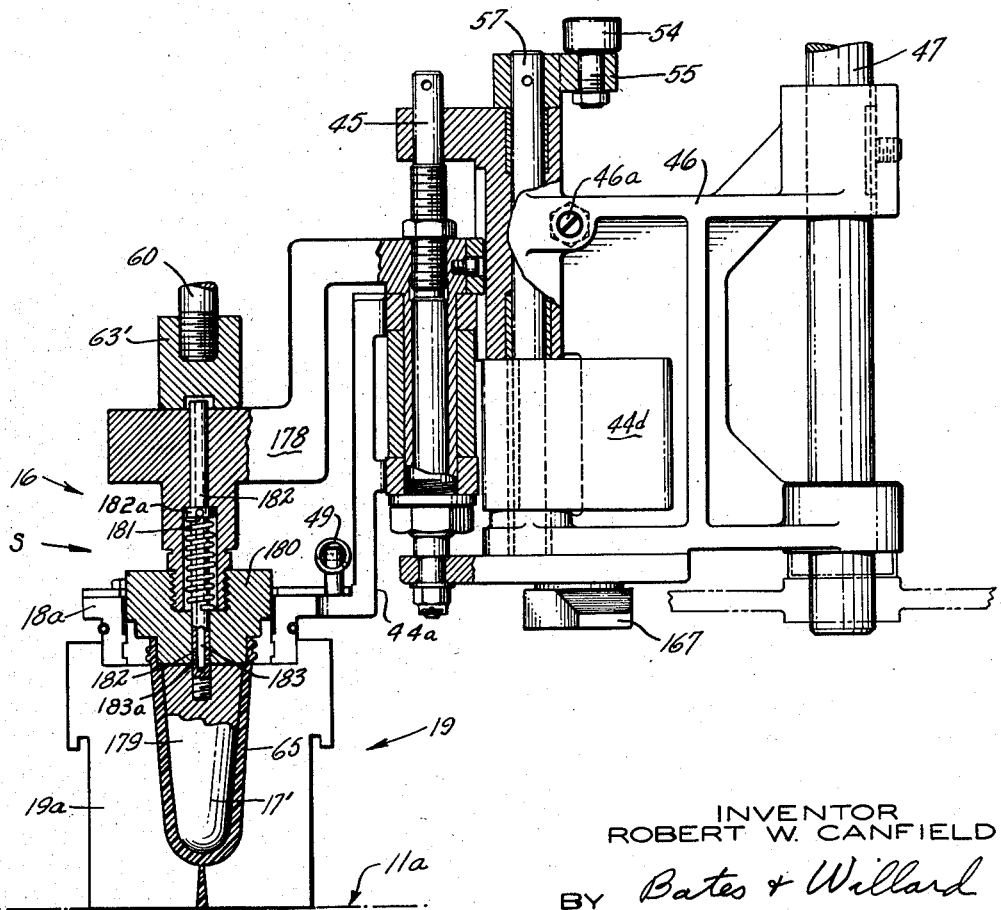

Dec. 1, 1959  R. W. CANFIELD  2,914,799
PLASTIC BOTTLE BLOWING APPARATUS
Filed Jan. 5, 1954  10 Sheets-Sheet 7

INVENTOR
ROBERT W. CANFIELD
BY *Bates & Willard*
ATTORNEYS

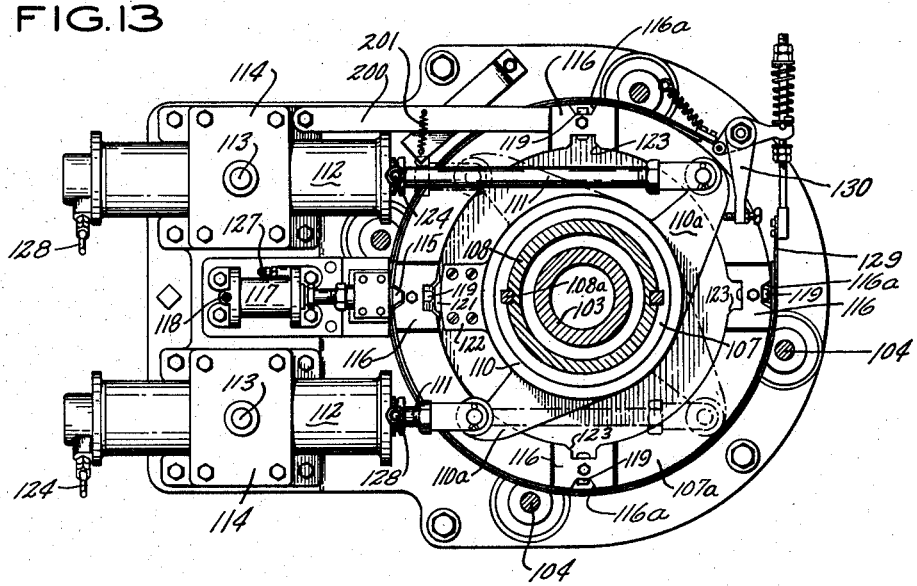
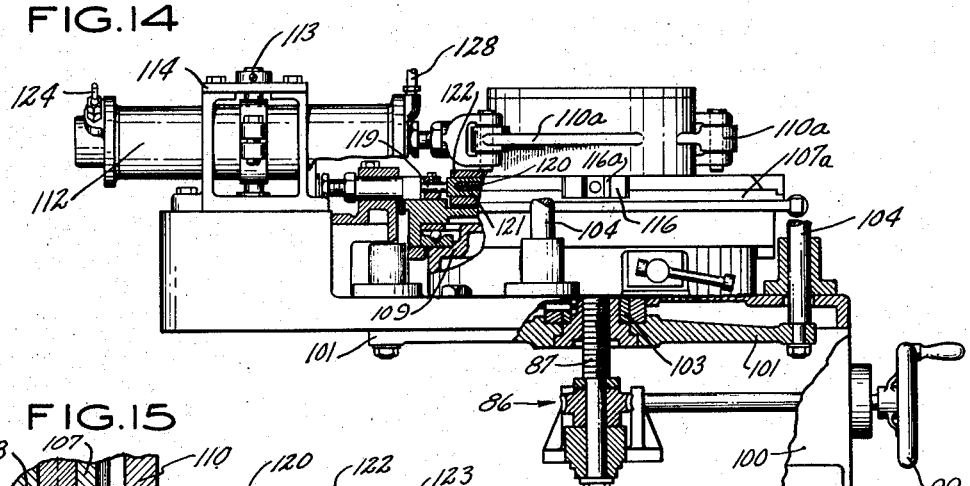
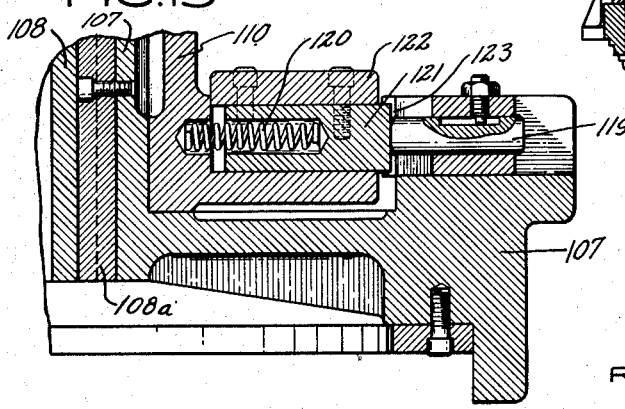

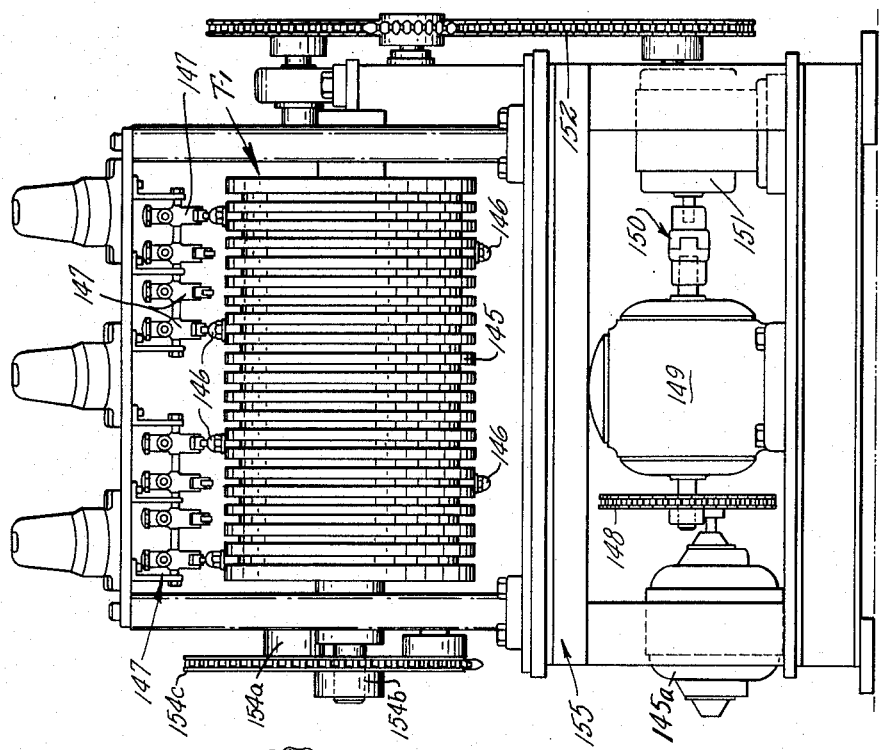
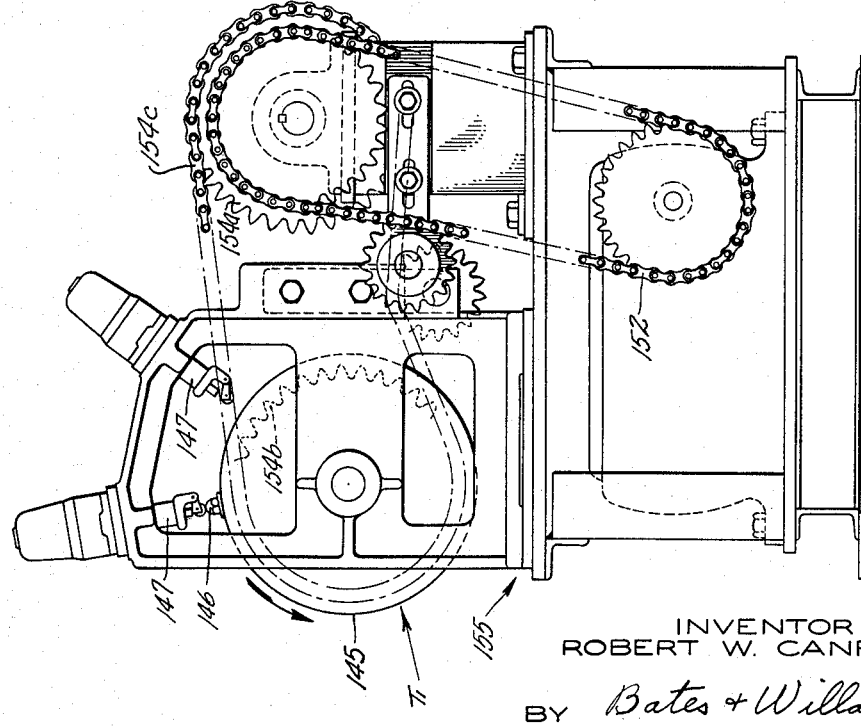

Dec. 1, 1959 R. W. CANFIELD 2,914,799
PLASTIC BOTTLE BLOWING APPARATUS
Filed Jan. 5, 1954 10 Sheets-Sheet 10

INVENTOR
ROBERT W. CANFIELD
BY Bates & Willard
ATTORNEYS

United States Patent Office 2,914,799
Patented Dec. 1, 1959

2,914,799
PLASTIC BOTTLE BLOWING APPARATUS

Robert W. Canfield, West Hartford, Conn., assignor to Plax Corporation, West Hartford, Conn., a corporation of Delaware Application January 5, 1954, Serial No. 402,278

11 Claims. (Cl. 18—5)

This invention relates to improvements in apparatus for molding articles of plastic material and particularly hollow articles such as containers from organic materials while in plastic condition.

The general object of the invention is to provide apparatus of the above character with which such articles may be produced in a simple and efficient manner.

More particularly, it is an object of the invention to provide for accurate distribution of the organic plastic material in the walls of hollow articles.

Generally considered, the invention involves the formation of a blank or preform by injecting plastic organic material into a blank or parison mold unit, the transfer of the blank to a blow mold unit and the blowing of the blank in that unit. The terms "injection," "injecting," or "injection molding," as understood in the art of molding organic plastic materials, and as used herein, mean subjecting such material to heat and pressure in an injection device and forcing it into a die or mold cavity which generally is closed except where the material enters the cavity and there molds the plastic to predetermined size and shape. Injection molding differs from extrusion molding in which the plastic material is shaped by an extrusion nozzle or die through which the material is forced and from which it is discharged in a desired shape into the atmosphere.

The invention may more clearly be understood by reference to the accompanying drawings which illustrate a novel machine embodying the invention and in which drawings:

Fig. 2 is a plan view of the machine shown in Fig. 1;

Fig. 3 is an enlarged vertical section of the portion of the mechanism shown in Fig. 1 which feeds plastic material to a blank or parison mold;

Fig. 6 is an enlarged top plan view of neck mold transfer and operating mechanism shown in Figs. 1 and 2 and shows a part of the path of travel of the neck mold;

Fig. 7 is a further enlargement of the neck mold transfer at the blank mold station;

Fig. 8 is a cross-sectional view taken on line 8—8 of Fig. 7 and shows a modification in which the plunger is secured to the neck mold transfer arm rather than to the piston rod as shown in Fig. 1;

Fig. 12 is an enlarged view partly in cross-section taken generally on line 12—12 of Fig. 9 showing blow mold and bottom plate operating mechanism;

Fig. 13 is an enlarged cross-sectional view of turret rotating mechanism taken on line 13—13 of Fig. 1;

Fig. 14 is a side elevation view partly broken away of the turret operating mechanism shown in Fig. 13;

Fig. 15 is an enlarged cross-sectional view of latching mechanism shown in Figs. 13 and 14;

Fig. 16 is an enlarged side elevational view of timer mechanism as viewed from the left of Fig. 2;

Fig. 17 is an elevation view of the timer apparatus as seen from the left of Fig. 16;

Figure 1:
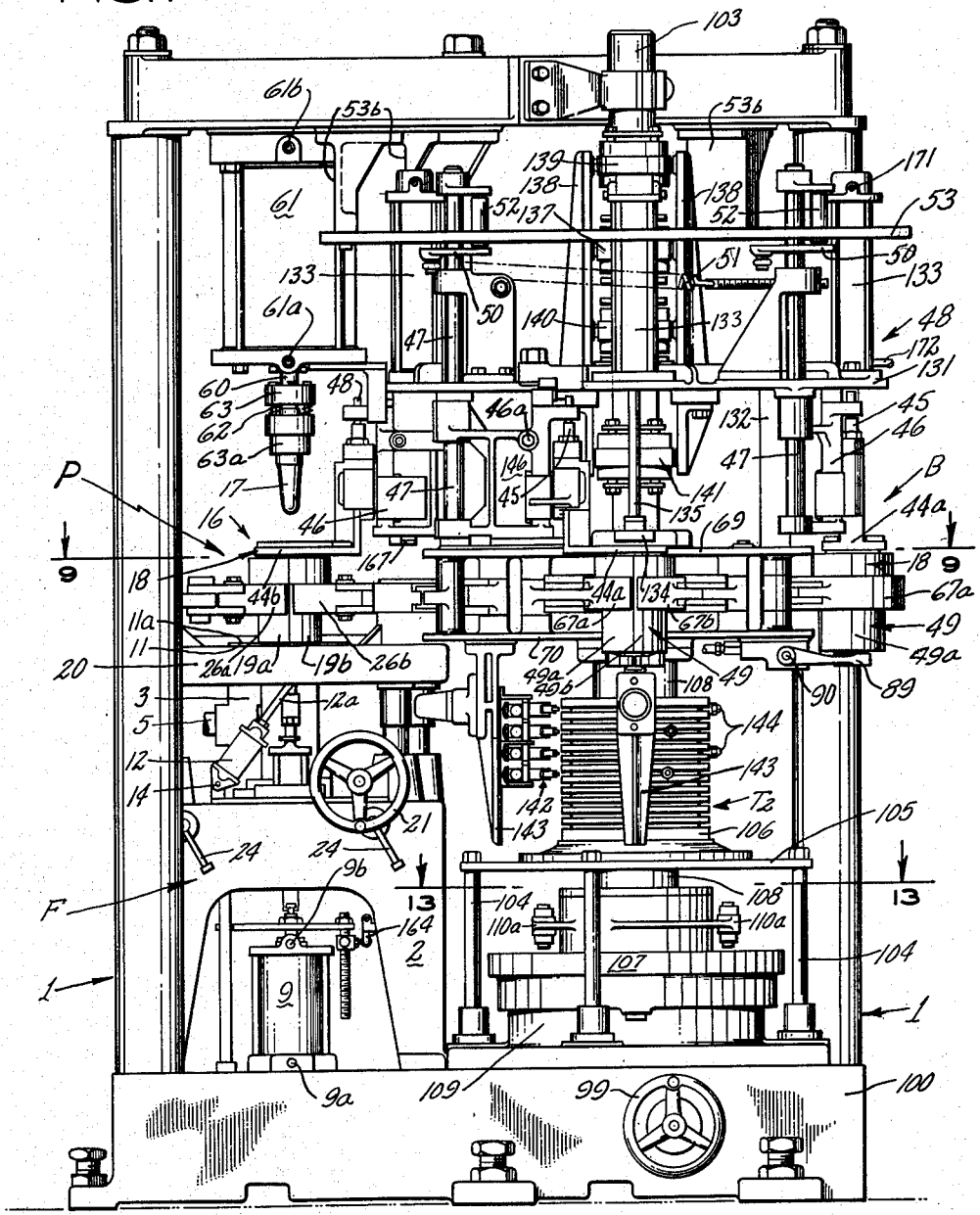
Figure 1 is a front elevation view showing principal components of the machine.

Referring to Figs. 1 and 2, the illustrated machine includes a stationary rigid base and frame generally designated 1 on which are operably mounted a number of principal components. Generally the components are a feeding mechanism F, a blank or parison molding apparatus P and a blow-molding apparatus B, the operation of all of which are controlled by timers $T_1$ and $T_2$ and are hereinafter described in greater detail.

Feeding mechanism

More particularly, the feeding mechanism F includes a table 2 on which there is rigidly secured, as shown in Figs. 1 and 3, a block 3. As shown in Fig. 3 block 3 has a vertically disposed bore 4 into which plastic material is fed from a suitable source, such as an extruder (not shown), through passage 5 of a supply block 6 so that the plastic material enters the bore 4 at a point adjacent to its upper end. Preferably the blocks 3 and 6 are suitably cored for the circulation of a fluid medium, as indicated generally at 7, or fitted with electric heater units with which the temperature of the blocks 3 and 6 and the plastic material can be controlled.

Located in the lower portion of the bore 4 is a piston 8 which is reciprocated by an air cylinder motor 9 (Fig. 1) to which operating air is supplied through line 9a by the timer $T_1$ (Fig. 2). The timing of the piston 8 is controlled so that in the lowermost position of the piston 8 the bore 4 accommodates a plastic charge which subsequently is discharged through a nozzle 10 at the top of the bore 4 when the piston 8 is forced to the top of its stroke by the motor 9 responsive to the timer $T_1$.

As shown in Fig. 3, the top surface 10a of the nozzle 10 is flush with the top surface 11a of a mold bed table 11 and is provided with a conical restrictive aperture which is opened and closed by a rotary valve 10b that is operated by an air cylinder motor 12 to the piston rod 12a of which the valve 10b is connected by a connector 13. The motor 12 is actuated by air regulably supplied and exhausted through lines 14 and 15 from the timer $T_1$.

The plastic charge from the chamber 4 is fed from the nozzle 10 into a blank mold, generally designated 16 (Fig. 1), which is composed of an internal mold plunger or core 17 and split neck mold sections 18a, 18b of a neck mold 18 (Fig. 6), together with the body mold sections 19a, 19b of a body mold 19 which are operated by the parison molding mechanism P.

Parison molding mechanism

Figure 4:
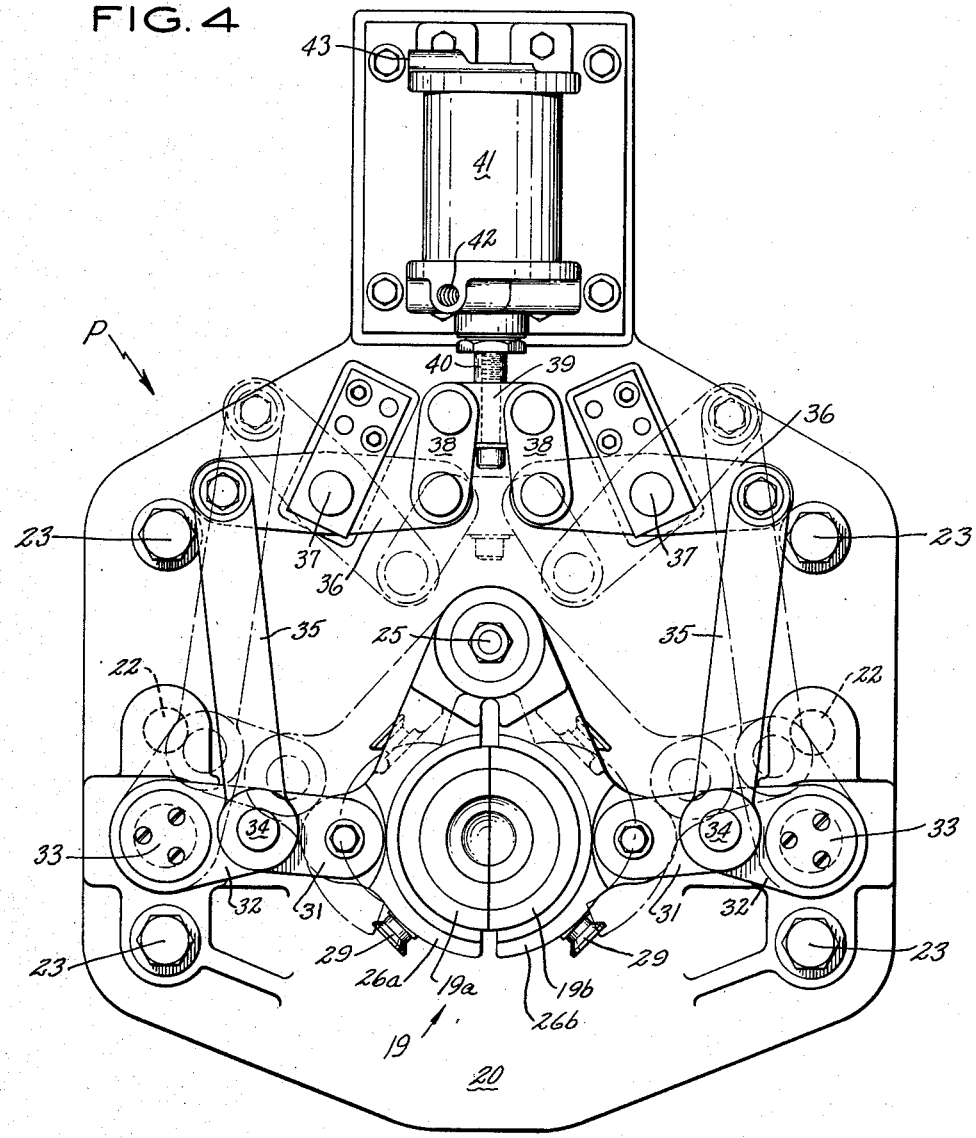
Fig. 4 is an enlarged top plan view of blank mold operating mechanism shown in Figs. 1 and 2.
Figure 5:
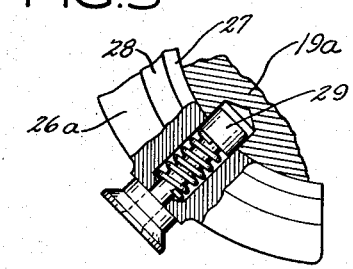
Fig. 5 is an enlarged fragmentary view of a portion of a mold holding arm shown in Fig. 4.

More particularly, the parison molding mechanism, as shown in Figs. 4 and 5, includes a table 20 which may be raised and lowered by a hand wheel 21 (Fig. 1) through jack screws 22 and worm and gear drive (not shown). The table 20 includes leg posts 23 which may be locked by dogging levers 24 (Fig. 1) to the table 2 so that the table 20 and the mold sections 19a, 19b which it slidably supports are properly located relative to the feed nozzle 10 (Fig. 3).

Secured to the table 20 is a perpendicular pivot post or pin 25 on which are pivotally secured a pair of mold holder arms 26a, 26b to which the respective mold sections 19a, 19b are removably secured by cooperating rim flange 27 and recessed lip 28 and by spring biased fingers 29 in the mold holder arms 26a, 26b which seat and lock in aligned recesses in the parison body mold sections 19a, 19b.

As shown in Fig. 4, linkage for opening and closing the split mold sections 19a, 19b and the mold holder arms 26a, 26b includes two pairs of toggle links 31, 32, each toggle being pivotally secured at one end to a mold holder arm (26a, 26b) and at the other end to a stationary post 33. Toggle pins 34 between the toggle links 31, 32 are pivotally connected by links 35 with the outer ends of individual levers 36. The levers 36 are pivoted on pins 37 secured to the table 20 and are connected at their adjacent inner ends by links 38 to a cross head 39 secured to piston rod 40 of an air cylinder motor 41. The motor 41 is fastened to the table 20 and is supplied with operating air through lines 42 and 43 from the timer $T_1$ to advance and retract the rod 40 and thereby move the mold holder arms 26a, 26b between their closed position shown in solid line and their open position shown in phantom in Fig. 4.

As shown in Fig. 1, when the table 20 is adjusted to proper elevation by the hand wheel 21, the mold sections 19a, 19b are located with their bottom surfaces slidably supported on the feed table 11.

As shown in Figs. 1, 7 and 8, the body mold sections 19a, 19b, are adapted when open to receive the neck mold 18, and when closed to align the neck mold 18 with the body mold 19 for the blank molding operations.

The neck mold sections 18a, 18b are secured loosely to holder arms 44a and 44b, respectively, so that the sections 18a, 18b may be locked closed and properly aligned with and by the body mold sections 19a, 19b without restraint from the neck mold holder arms 44a, 44b.

*Parison transfer*

As shown in Figs. 6, 7 and 8, the mold holder arms 44a, 44b are pivotally carried on a vertical shaft 45 which is secured to the outer end of an arm 46, the inner end of which is keyed to a vertical shaft 47 that is rotatably journaled on a turret, generally designated 48 (Fig. 1).

Adjustably secured to the shaft 47 is a lever 50 (Figs. 1, 2 and 6) to one end of which is secured a tension spring 51 that yieldably pivots the shaft 47 and neck mold arm 46 clockwise (Fig. 7). The other end of the lever 50 carries a cam follower or roller 52 which follows cam track 53a (Figs. 2 and 6) of a stationary cam 53 that is secured by brackets 53b (Figs. 1 and 6) to the frame 1. The cam 53 restrains the neck mold 18 in alignment with its blow mold 49 during all but a small portion of a revolution of the turret 48.

As shown in Fig. 6, when one of the neck molds 18 on the rotating turret 48 (Fig. 2) approaches the body mold 19 (Fig. 2) the cam 53 allows the spring 51 to swing the arm 46 clockwise and thereby swing the neck mold 18 into alignment with the open body mold 19 at the blank mold station S.

Prior to reaching the blank mold station S, a cam following roller 54 which is carried at one end of a lever 55 engages cam surface 56a of a stationary cam 56. As the roller 54 follows the cam surface 56a, it slightly rotates the lever 55 and shaft 57 to which the lever 55 is secured whereupon a lever 58 fastened to the shaft 57 spreads apart rearward extensions 44c and 44d of the neck mold holder arms 44a and 44b, respectively, and thereby open the holder arms 44a, 44b, and the neck mold sections 18a, 18b, as shown in phantom at the lower right of Fig. 6, to release a molded article therefrom.

Thereafter, when the travel of the turret 48 carries the cam roller 54 past the cam 56, a spring 59 closes the arms 44a, 44b as shown in full lines in Fig. 6.

In order to cushion the final travel of the neck mold 18 to the blank mold station S, the neck mold transfer arm 46 is provided with an adjustable screw stop 46a (Figs. 6–8) which engages a snubber pin 46b that projects from an oil and spring dash pot 46c (Fig. 7).

At the completion of a blank molding operation at station S, the turret 48 is advanced a quarter turn, as hereinafter described, whereupon the cam 53 swings the neck mold 18 counterclockwise back into alignment with the blow mold 49 in the phantom position shown in the upper left of Fig. 6.

*Parison plunger*

As shown in Fig. 1, the plunger 17 for shaping the internal surface of the hollow parison is secured on the lower end of a piston rod 60 of an air cylinder motor 61 which is fastened to the frame 1 and supplied with operating air through lines 61a and 61b from the timer $T_1$ (Fig. 2) so as to advance and retract the plunger 17 into and from its molding position within the neck and parison body molds 18 and 19 at the parison or blank molding station S. Springs 62 and a loose connection 63 may be provided between the plunger 17 and rod 60 so that the plunger 17 readily may yield to and be secured and aligned properly by gripping engagement of the sections of neck mold 18. Preferably air is discharged from the plunger 17 as the latter is retracted from the neck mold 18 by the cylinder 61 so as to assist in separating the plunger 17 from the plastic preform in the mold 19. For this purpose, the plunger may be provided with structure like that provided in the modified plunger 17' hereafter described.

Fig. 8 illustrates a modification in which a plunger 17' is mounted on an arm 178 carried by the neck mold carrying arm 46. A pressure foot 63' on the piston rod 60 is adapted to press and hold down the plunger 17' against the pressure of plastic injected into the blank mold 19 from the nozzle 10.

The plungers 17 and 17' may be suitably cored to provide internal passages (not shown) for the circulation of fluid temperature controlling medium.

As shown in Fig. 8, the plunger 17' is in two parts 179, 180 which are yieldably held together by a spring 181 and tube 182 which is secured to plunger part 179 and extends upward slidably through plunger part 180 and out of the arm 178. Downward pressure on the tube 182 depresses the tube and a collar 182a secured thereto which compresses the spring 181 and separates the portions 179 and 180 of the plunger 17' so that blowing air may be discharged therebetween from passageway 183 and holes 183a through the tube 182. When the plunger 17 is provided with structure like that of plunger 17' so that the tip is yieldably extendable relative to portion 63a as the tip 179 of plunger 17' is relative to the portion 180, air may be discharged between the plunger tip and portion 63a when the plunger is retracted from the neck mold 18 so as to aid in separating the plunger from the preform in the mold 19. It will be understood that the air pressure for yieldably extending the plunger tip and separating the preform therefrom may be supplied to the plunger 17 as through a passageway, such as 183 of the plunger 17', by a suitable air pressure source and connecting line (not shown). Especially good results are obtained when the discharge of air from the plunger is spaced upwardly a substantial distance from the plunger tip.

In the case of the plunger 17' which accompanies the neck mold 18 and provides for transfer of blank 65 on the plunger, blowing air discharged from the tube 182 serves to inflate the blank 65 into molding engagement with the blow mold 49, as hereinafter described.

Blow molding mechanism

The illustrated machine is provided with four sections each of which has a neck mold 18 and a blow mold 49 in which to blow mold one or more articles. However, it will be understood that a lesser or greater number of sections may be provided on the turret 48, each having its neck mold 18 and associated blow mold 49. The following description of the components of one section is applicable to each of the sections and its components.

Figure 9:
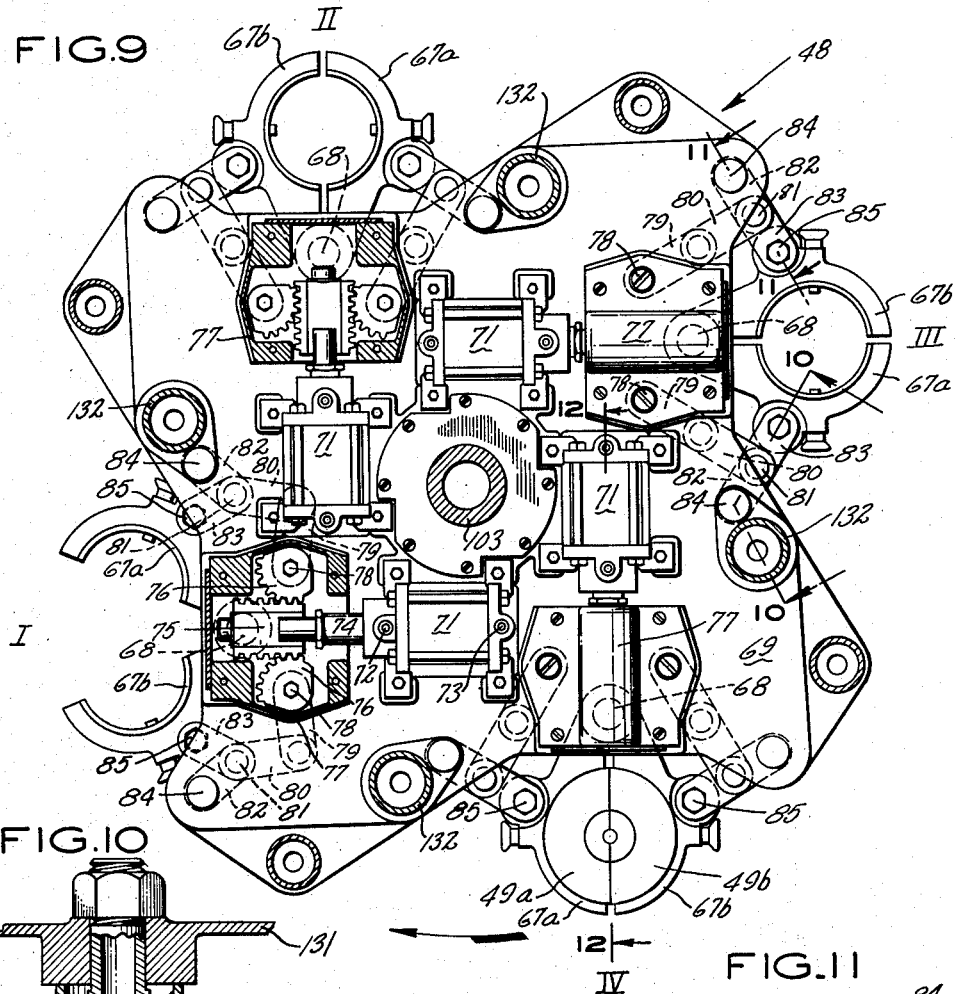
Fig. 9 is a cross-section view taken generally on line 9—9 of Fig. 1.

Referring more particularly to the turret 48 and the blow mold 49, the sections 49a, 49b of each blow mold, Fig. 9, are removably secured in mold holder arms 67a, 67b, respectively, supported on vertical shaft 68 between horizontal tables 69 and 70 (Fig. 1) of the turret 48.

As shown in Fig. 9, opening and closing of the blow mold sections 49a, 49b, is effected by air cylinder motors 71 which are supplied operating air through lines 72 and 73 from the turret timer $T_2$ (Fig. 1) to advance and retract piston rod 74. Secured to each of the rods 74 is a double rack 75 which meshes with a pair of pinion gears 76, 76. Preferably the rack 75 and gears 76 are enclosed in a gear box 77 and are immersed in lubricant therein. Shafts 78, 78, to which gears 76 are secured, extend downwardly out of the gear box 77 and have secured on their lower ends links 79 of toggles 79, 80. The outer ends of the toggle links 80 are pivotally secured to toggle pins 81 of toggle links 82, 83, links 82 of which are pivoted on stationary studs 84 and links 83 of which are pivotally secured to the blow mold holder arms 67a, 67b, by pins 85.

Figure 10:
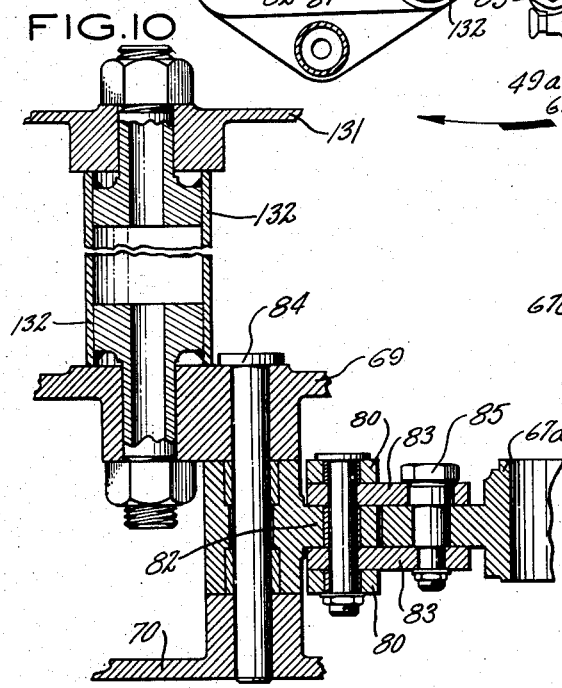
Fig. 10 is an enlarged cross-section view taken on line 10—10 of Fig. 9.
Figure 11:
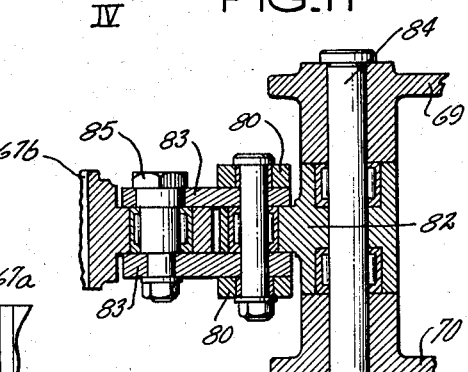
Fig. 11 is an enlarged cross-section view taken on line 11—11 of Fig. 9.

As shown in Figs. 10 and 11 the pins 84 for the arms 67a and 67b are secured to the turret tables 69 and 70. Air pressure supplied from the timer $T_2$ (Fig. 1) through line 72 retracts the piston rod 74 and pivots the gears 76 so as to straighten the toggles 79, 80 and 81, 82 and thereby close the mold holder arms 67a, 67b and the blow mold sections 49a, 49b which they carry. Air pressure through the line 73 advances the piston rod 74 and opens the mold holder arms to the position shown in the lower left of Fig. 9.

The blow mold sections 49a, 49b open and close on the neck mold 18 and on a bottom plate 88 (Fig. 12). The bottom plate 88 is secured to an arm 89 which is secured to a horizontal shaft 90 rotatably journaled in gear box 91 secured to the turret table 70. A pinion gear 92 is keyed to the shaft 90 and meshes with a rack 93 which is advanced and retracted by piston rod 94 of a motor 95 that is operated by air supplied by the timer $T_2$ through lines 96 and 97. Advancing the rack 93 pivots the arm 89 and the bottom plate 88 downwardly to the position in phantom in Fig. 12 and retraction of the rack returns the bottom plate 88 to its solid line position.

The elevation of the bottom plate 88 relative to the blow mold 49 may be adjusted by means of a threaded stud 98 between the plate and the pivot arm 89 and the connection between the stud 98 and the plate 88 is a sloppy one so that the plate is readily accommodated in the blow mold sections.

The elevation of the turret 48 may be adjusted by a hand wheel 99 (Figs. 1 and 14) so that the turret 48 locates the neck molds 18 at the proper elevation for accommodation by the body mold sections 19a, 19b.

More particularly, as shown in Fig. 14, rotation of the hand wheel 99 by means of worm and worm wheel 86 within the base housing 100, raises and lowers a main bearing shaft 87 which carries a spider 101 that nonrotatably supports vertical hollow shaft 103 and the supporting legs 104 of a table 105 (Fig. 1) on which the vertically disposed drum 106 of the timer $T_2$ is affixed concentric with the shaft 103.

Concentrically disposed between the shaft 103 and the drum 106 is a hollow shaft 108 which is rotatably supported by the shaft 103 and on which the turret tables 69 and 70 are secured so that step-by-step rotation of the shaft 108 and the tables advance each blow mold 49 through the four stations I, II, III and IV successively and each neck mold 18 successively through stations I, II, III and the blank mold station S.

Turret drive and indexing mechanism

More particularly as shown in Figs. 13–15, the turret drive includes a bull ring 107 which is rotatably supported on a cylindrical bed plate 109 affixed to the housing 100. The shaft 108 is slidably keyed at 108a to the bull ring 107 for rotation therewith. Rotatably mounted on the ring 107 in the annular space between a shoulder 107a of the ring and the shaft 108 is a drive ring 110 which has a pair of ears 110a to which piston rod 111 of a pair of air motors 112 are pivotally secured. The housings of the motors 112 are each pivotally secured as at 113 within brackets 114 which are fixed to the housing 100.

A detent 115 is resiliently urged to seat successively in notches 116a in blocks 116 disposed at 90° intervals about the rim of the ring 107 and thereby advance and index the turret 48.

More particularly, the detent 115 normally is biased into resilient engagement with the notched rim of the bull ring 107 by an air motor 117 which is supplied air pressure through line 118 from the timer $T_1$ (Fig. 2).

When the detent 115 projects into one of the notches 116a it presses inwardly a pin 119 which thereupon presses inwardly against a yieldable compression spring 120, a detent 121 which is radially reciprocable in a housing portion 122 of the drive ring 110 and thereby forces the detent 121 out of a notch 123 in the inner periphery of the bull ring. When air is supplied by the timer $T_1$ through line 118, the bull ring 107 is latched by the detent 115 against rotation and the detent 121 is unlatched from notch 123 thereby permitting rotation of the drive ring 110 without rotating the bull ring 107.

It will be apparent from Fig. 13 that when air is supplied by the timer $T_1$ through lines 124 to the motors 112 while air pressure is established in line 118, the piston rods 111 of the motors 112 rotate the drive ring 110 counterclockwise from its solid line to its dotted line position shown in Fig. 13 while the bull ring 107 remains stationary. At the completion of a quarter turn of the drive ring 110, the spring 120 forces the detent 121 into latching engagement with the aligned notch 123. Thereafter, air pressure supplied by the timer $T_1$ through line 127 to the motor 117 retracts the detent 115 out of latching engagement with the bull ring 107. Substantially concurrently the timer $T_1$ supplies air pressure through lines 128 to the motors 112 which rotate clockwise the drive ring 110 (Fig. 13) and the bull ring 107 to which it is latched by the detent 121. Rotation of the bull ring 107 effects like rotation of the turret 48 and the turret shaft 108 to which it is keyed at 108a. Following initiation of the clockwise rotation, air pressure is switched by the timer $T_1$ from line 127 to 118 of the motor 117 so that upon completion of a quarter turn, the detent 115 is forced into its bull ring notch 116a to prevent further rotation of the drive ring 110 and the turret 48.

In order to decelerate the latter portion of each quarter turn and prevent over travel of the turret, a brake 129 is provided which is tightened about the bull ring 107 by the crank 110a prior to completion of each quarter turn of the bull ring. Brake pressure is relieved by disengagement of the drive ring ear 110a from the brake loading lever 130 when the drive ring 110 is returned to the position shown in phantom in Fig. 13.

Back lash is prevented by a pawl 200 which is drawn by a spring 201 into abutting engagement with a housing block 116 on the ring 107 at the completion of each quarter turn.

Blowheads

The turret 48 includes an upper table 131 which is secured by posts 132 to the table 69 and carries four air motors 133 for lowering and raising blowheads 134 (Fig.

1) into and out of blowing engagement (Fig. 12) with their respective neck molds 18. In each instance, the connection between the blowhead 134 and piston rod 135 of the motor 133 includes a spring 134a which yieldably forces the head 134 to an outer or lower position on the rod 135 where set screw 134b in the head engages the lower end of a slot 135c in a pipe or tube 135a which fixedly projects downward from a collar 135b secured to the lower end of the piston rod 135. However, when the head 134 is forced into engagement with the neck mold 18 by the motor 133, the head is forced upwardly on the rod 135 and thereby connects blowing air line 136 through a valving orifice 136c with blowing air outlet 136a from the head 134.

The outlet pipe 135a extends slightly below the bottom of the blowhead 134 (Fig. 12) so that when the parison 65 is transferred to the blow mold 49 on the plunger 17' (Fig. 8) the lower end of the pipe 135a engages and depresses the plunger pipe 182 and the lower portion 179 of the plunger 17' so that the parison 65 is stretched longitudinally preparatory to blow molding.

The arrangement has the advantage of initiating the stretching of the blank 65 by the elongation of the plunger 17'. Moreover, the blowing air is introduced annularly at a substantial distance from the tip of the plunger 17' and makes for greater uniformity of stretch and plastic distribution.

Blow molding also may be effected, as shown in Fig. 12, where the parison has been transferred away from the plunger 17 by the neck mold 18 and blow molded, as at 65a, in the blow mold 49.

The line 136 is continually supplied with blowing air from a supply line in the turret shaft 103 through a sleeve 137 which rotates thereon and is secured to brackets 138 of the turret.

The brackets 138 also support additional sleeves 139, 140 and 141 on the shaft 103. Sleeves 139 and 140 respectively supply and exhaust cooling water to the molds 49 for regulating their temperature.

Turret timer

The sleeve 141 supplies operating air to the valves generally designated 142 of the turret timer $T_2$ (Fig. 1) which are mounted on four brackets 143 depending from turret table 70 and which are rotatable therewith about the timer drum 106. The brackets 143 are disposed at equally spaced intervals and each bracket 143 carries the valves 142 which control the supply of air pressure from sleeve 141 for operating the components of one of the stations (I, II, III and IV). Buttons 144 adjustably secured on the drum 106 actuate the valves 142 in any selected sequence.

Main timer and drive

As shown in Figs. 16 and 17, the main timer $T_1$ includes a drum 145 having adjustable buttons 146 for operating valves, generally designated 147, which supply operating air to the several air motors of the blank-mold forming components and turret rotating mechanism.

More particularly, the timer drum 145 is rotated by a motor 145a through a chain drive 148 to an adjustable variable speed changer 149 which drives through a coupling 150 and a speed reducer 151. The reducer 151, through a chain drive 152, rotates the plate 153a (Fig. 19) of a clutch 153, the other plate 153b of which drives the drum 145 through a drive which includes sprockets 154a and 154b and the chain 154c.

As shown in Figs. 16–20, the identified components of the timer $T_1$ and drive are operably mounted on frame members, generally designated 155, and include suitable bearings for the movable components.

Figure 18:
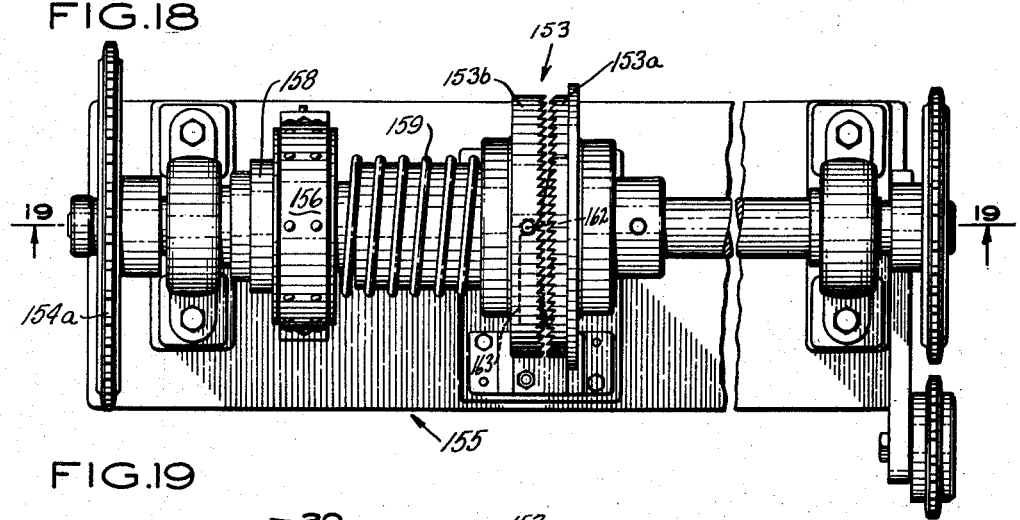
Fig. 18 is a top plan view of clutch drive mechanism shown at the right of Fig. 16.
Figure 19:
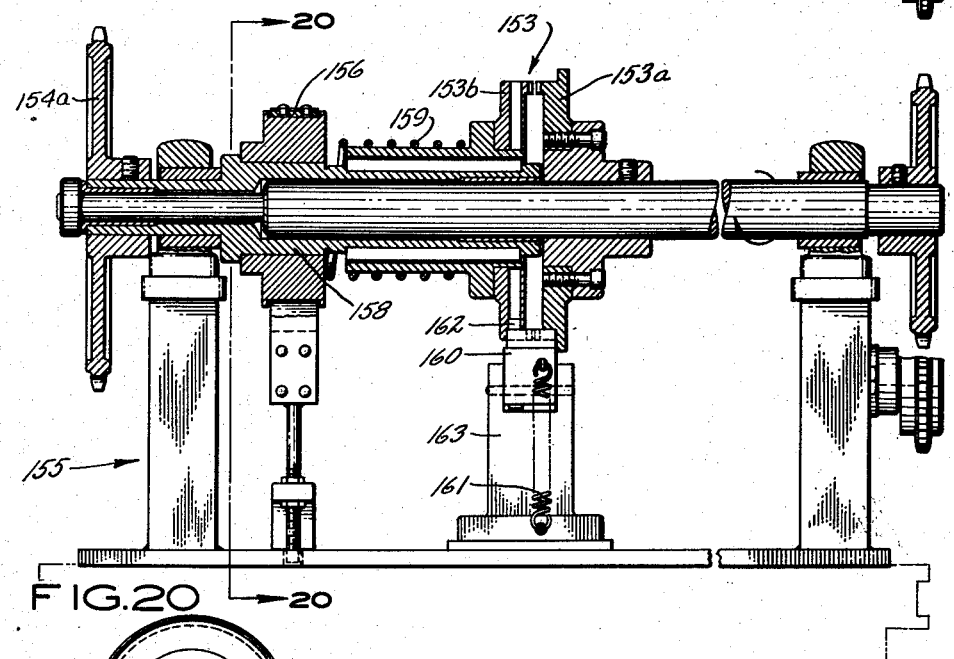
Fig. 19 is an elevation view of the clutch drive shown in Fig. 18 portions of which are shown in cross-section as viewed from line 19—19.
Figure 20:
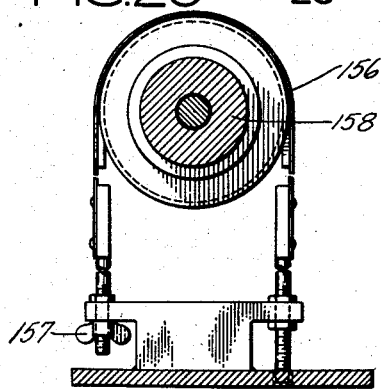
Fig. 20 is a cross-sectional view taken on line 20—20 of Fig. 19 showing a brake portion of the drive.

As shown in Figs. 18–20, a brake 156 on the shaft 158 may be adjustably loaded by a wing nut 157 in order to prevent their over travel and back lash.

A spring 159 yieldably presses the clutch plate 153b into driving engagement with clutch plate 153a. Disengagement of the clutch plates 153a and 153b is effected by a spreader cam 160 which is yieldably drawn by a spring 161 into the path of a pin 162 on the plate 153b so that upon completion of one revolution the plate 153b is disengaged from the continually rotating drive plate 153a. Energization of a solenoid 163 to retract the cam 160 out of engagement with the pin 162 and free the clutch plate 153b to repeat a revolution of the timer drum 145 is effected by closing a switch 164 (Fig. 1) responsive to the feed piston 8 at the bottom of its stroke when a full charge of plastic is in the chamber 4 for injection into the blank mold 19.

Operation

In normal continuous operation, plastic material is continually fed to the chamber 4 through the feed line 5 from a conventional screw extruder (not shown).

The closing of the switch 164 energizes the solenoid 163 which moves the cam 160 out of engagement with the pin 162. Freed of the restraint which the cam 160 exerts on the clutch plate 153b through engagement with the pin 162, the spring 159 presses the plate 153b into clutching engagement with the drive plate 153a whereupon a revolution of the drum 145 of the timer $T_1$ is initiated.

Immediately thereafter, one of the timer valves 147 is actuated by a timer button 146 on the rotating drum 145 and supplies operating air through line 14 to operate the air motor 12 which advances the piston rod 12a to open the nozzle valve 10b. Upon further rotation of the timer drum, button 146 operates valve 147 which supplies operating air pressure through line 9a to operate the motor 9 and thereby raises the piston 8 and forces plastic material from the chamber 4 through the open nozzle valve 10b into the blank molding chamber defined by the plunger 17 and the closed neck and body molds 18 and 19.

In order to prevent too rapid movement of the piston 8, preferably the air pressure in line 9a is exerted indirectly through oil or other viscous liquid which passes through a small restrictive aperture (not shown) and transmits the pressure of the air to the motor 9.

With the initial upward movement of the feed plunger 8, the switch 164 is spring-biased open thereby deenergizing the solenoid 163 and permitting the spring 161 to draw the cam 160 into the path of the pin 162 so that the clutch 153 is automatically opened, as shown in Figs. 18 and 19, upon completion of one revolution of the clutch plate 153b and of the timer drum 145.

When the cavity of the blank mold 16 is filled, the greater pressure exerted by the extruder on the plastic in the supply line 5 overcomes the lesser pressure exerted by the motor 9 and the piston 8 is depressed by the plastic filling the chamber 4. Subsequently, upward movement of the piston rod 8 with initiation of a repetition of the blank injecting operation permits the switch 164 to be spring-biased closed thereby restarting the extruder and reestablishing the flow of plastic through line 5 into chamber 4.

Substantially concurrently with the filling of the cavity of the blank mold 16, the rotating timer drum 145 operates two of the valves 147, one of which thereupon supplies air through line 15 to retract the piston rod 12a and close the nozzle valve 10b, and the other of which discontinues the supply of air through line 9a to the injection motor 9.

If the chamber 4 is filled before completion of the revolution of the timer drum 145, so that the nozzle valve 10b is not promptly reopened and the cycle repeated, further downward movements of the piston rod 8 responsive to additional plastic from the extruder causes the rod 8 to open and hold open a safety switch 164 which interrupts the extruder and discontinues the flow of plastic through supply line 5 into the chamber 4.

Following closing of the nozzle valve 10b, the timer $T_1$ successively supplies operating air to the plunger operating motor 61, the blank mold operating motor 41 and a neck mold raising motor 165 (Fig. 7).

More particularly, air pressure is supplied to the motor 61 through the line 61a which raises the plunger 17 to its upper position shown in Fig. 1 out of the blank or parison 65.

In the case of the modification shown in Fig. 8, where plunger 17' is secured to the neck mold arm 46, the motor 61 raises the pressure foot 63' which counteracts the upward pressure of the plastic during the formation of the blank 65.

The motor 41 when operated by air supplied through the line 43 advances the piston rod 40 and moves the mold holder arms 26a and 26b and the body mold sections 19a and 19b to their open positions shown in phantom in Fig. 4.

Operating air pressure is supplied by the timer $T_1$ to the motor 165 which thereupon raises a plate 167 (Figs. 1, 7 and 8) which lifts the neck mold supporting arm 46 and the neck mold 18 so as to raise the blank 65 and break any connection with the plastic in nozzle 10, thereby freeing the blank 65 for movement with the neck mold 18 to the blow mold 49.

At any desired time prior to the raising of the neck mold, the timer $T_1$ supplies air pressure through line 127 to cause the motor 117 to retract the detent or pawl 115 from the notch 116a and thus free the bull ring 107 and the turret 48 for rotation.

After the timer $T_1$ actuates the motor 165 to raise the neck mold 18, the timer supplies operating air through the lines 128 to rotate the drive ring 110 and the bull ring 107 to which it is latched by the sliding detent or pawl 121. Following initiation of rotation of the bull ring 107 and the turret 48 to which it is keyed, the timer $T_1$ relieves the pressure in line 127 and applies it in line 118 so that the pawl 115 is resiliently pressed against the rotating bull ring 107 and slides into latching engagement with the notch 116a when aligned therewith, thereby limiting rotation of the ring 107 and turret 48 to a quarter turn. When moving inwardly to latch position, the detent 115 engages and advances the pin 119 which engages and forces the detent 121 in the drive ring 110 out of latching engagement wtih the notch 123 in the ring 107.

Prior to completion of the quarter turn, the ear 110a engages the brake crank 130 and tightens the brake 129 so as to place a decelerating drag upon the final portion of the quarter turn at the completion of which the pawl lever 200 is drawn by the spring 201 into anti-backlash engagement with the block 116 on the bull ring 107.

Thereafter when the turret is locked against movement the timer $T_1$ relieves the pressure in line 128 and establishes pressure in the lines 124 so that the drive ring 110 is rotated back to the position shown in phantom in Fig. 13 without backward rotation of the bull ring 107 and turret 48 preparatory to repeating advancement of the turret 48 through another quarter turn of forward rotation.

As will be apparent from Fig. 6, rotation of the turret 48 causes the cam track 53a to force the follower 52 counterclockwise about the shaft 47 and thus swing the arm 46 off the plate 167 (Fig. 7) so as to lower the neck mold 18 and the parison 65 and swing them into the open blow mold sections 49a and 49b as shown in phantom in the upper left of Fig. 6.

The timer $T_1$ may relieve the air pressure in the line 166 so as to lower the plate 167 any time after the blank or parison 65 has cleared the feed table 11 either before or after the arm 46 has left the plate 167.

Following location of the blank 65 within the open blow mold sections 49a and 49b, the bottom plate 88 is raised, the blow mold sections are closed, the blow head 134 is lowered and the blank 65 is blow molded to the final shape of the mold cavity shown in Fig. 12.

More particularly, rotation of the turret 48 causes buttons 144 on the stationary drum 106 of the timer $T_2$ to operate the valve 142 which supplies air pressure through line 96 to the motor 95 and thereby effects retraction of the rod 94 and elevates the bottom plate 88 to the solid line position shown in Fig. 12. Thereafter, the timer $T_2$ supplies operating air through line 72 to retract the piston 74 of motor 71 and close the mold sections 49a and 49b on the neck mold 18 and bottom plate 88, thereby properly aligning all of the mold components prior to blow molding of the article 65a therein. The timer $T_2$ thereafter supplies air through a line 171 to the motor 133 which forces the blow head 134 downwardly onto the neck mold 18.

The downward movement of the piston rod 135 opens the blowing air line 136 through the head 134 whereupon blowing air is discharged through tube 136a to expand and hold the parison 65 in molding engagement with the blow mold 49 (Fig. 12).

As is apparent from Fig. 6, the movement of the neck mold 18 and the blank 65 into the blow mold sections 49a and 49b and the heretofore described blow mold closing and blowing operations are effected during movement of the blow mold 49 from station I to station II. Between stations II and IV, the blown article 65a is cooled or otherwise set in the blow mold while the blowing air pressure is maintained therein by the blow head 134.

Thereafter the blown and set article 65a is removed after the blow mold 49 leaves station IV and before the neck mold 18 returns to the blank mold station S at which the neck mold is located when the open blow mold 49 is at station I.

It further will be understood, that the hereinafter described sequence of operations which occur while the blow mold moves from station IV to station I also occur while the preceding blow mold 49 moves from station I to station II and the heretofore described operations are effected.

More particularly, as the mold 49 leaves station IV, air is supplied by the timer $T_2$ through a line 172 to the motor 133 which raises the blow head 134 whereupon the spring 134a forces the head downwardly on the rod 135 and closes the blowing air line 136.

Thereafter the timer $T_2$ successively opens the blow mold sections 49a, 49b and lowers the bottom plate 88 by disconnecting the air pressure to lines 72 and 96 and connecting operating air pressure to lines 73 and 97 of the motors 71 and 95, respectively.

As the turret 48 rotates, the neck mold 18 which is leaving station IV for station I is swung out of the open blow mold sections 49a and 49b by the spring 51. Responsive to the engagements of the follower 52 with the cam track 53a, the neck mold 18 follows the path marked by arrow in Fig. 6 to the blank mold station S at which it is located when the open blow mold sections 49a and 49b are at station I.

It will be understood that the travel of the neck mold 18 to the blank molding station S is concurrent with the travel of the preceding neck mold 18 from the station S to blow mold station II and is effected by the same quarter-turn of the turret 48 responsive to the cam 53.

Prior to reaching the blank mold station S, the cam follower 54 is engaged by the cam 56 which opens the neck mold 18 as shown in phantom at the lower right of Fig. 6 and drops the blown article from the neck mold into a bin, chute or the like. Thereafter, the follower 54 leaves cam 56 and the spring 59 closes the neck mold sections 18a, 18b. While the turret 48 is stationary, the timer $T_1$ closes the blank mold sections 19a, 19b; lowers the plunger 17; latches the bull ring 107 with the detent 115; and rotates the drive ring 110 counterclockwise (Fig. 13) preparatory to forming a new blank 65 at the station S and blow molding a new article 65a at the blow mold station II.

Closing of the body mold sections 19a, 19b is effected by the timer T₁ which supplies operating air through the line 42 to the motor 41 whereupon the latter retracts the piston rod 40 and closes the mold holder arms 26a, 26b, as shown in solid line in Fig. 4.

It should be understood that when the plunger 17' (Fig. 8) is provided for plunger transfer, the pressure foot 63' which replaces the plunger 17 on the piston rod 60 is adapted to engage the top of the arm 178 and hold the latter together with the neck mold 18, plunger 17' and the body mold 19 against upward displacement by the pressure of incoming plastic.

I claim:

1. Apparatus for forming blown hollow articles from organic plastic material including a series of spaced blow molds mounted to be movable in a predetermined path in succession through separate stations disposed along said path, drive means connected to effect step by step movement of said blow molds successively through said stations, a blank mold including a body mold mounted spaced from but adjacent said predetermined path of movement of said blow molds at a blank mold station and a plunger cooperable with said body mold, a neck mold operatively associated with each of said blow molds, a blowhead to blow mold articles from plastic blanks in said blow molds and neck molds, means mounting each of said neck molds to be movable with its associated blow mold in said predetermined path and depart therefrom at said blank mold station, guide means extending along at least the portion of said path adjacent said blank mold station and stationarily mounted with respect to said blow molds and neck molds to be engaged by each of said mounting means for said neck molds, said mounting means of each neck mold engaging said guide means during passage of each neck mold to and from said blank mold station to cause each neck mold to depart from and return to said predetermined path at said blank mold station, each said neck mold during departure from said path at said blank mold station moving into cooperation with said body mold to form therewith and with said plunger a blank mold, and means for introducing plastic material into said blank mold to form a blank therewithin for subsequent transfer to a blow mold upon movement of said blow molds along said path.

2. Apparatus as recited in claim 1 and wherein the body mold is a multi-section mold the bottom surfaces of which sections are slidably supported on a table above a nozzle for injecting plastic into the bottom of the body mold.

3. Apparatus as recited in claim 1 and wherein said neck molds are mounted for transverse movement between the body and blow molds and for vertical movement into and out of engagement with the body mold, and including means for raising said neck mold upwardly from the body mold.

4. Apparatus as recited in claim 1 further including a series of said plungers, each of which is individual to a neck mold and blow mold, and each of said plungers being movable with the neck mold with which it is associated.

5. Apparatus as recited in claim 1 wherein said means for introducing plastic material into said blank mold includes means for plasticizing and injecting a predetermined quantity of plastic material into said blank mold.

6. Apparatus as recited in claim 1 wherein said blow molds are mounted on a rotatably supported turret with said stations disposed around the perimeter of said turret, and said drive means is connected to said turret to effect step by step rotation thereof.

7. Apparatus as recited in claim 6 wherein said guide means includes a cam ring stationarily mounted to encircle the rotation axis of said turret.

8. The apparatus recited in claim 6 and including means for adjusting the elevation of the turret and the neck molds relative to the elevation of the body mold.

9. The apparatus recited in claim 6 including a first timer for controlling operation of the body mold, the plastic supply means and the step-by-step rotation of the turret, and a second timer for controlling operation of the blow molds.

10. Apparatus as recited in claim 7 wherein said mounting means for each neck mold includes a pivotally mounted arm supporting a neck mold and a cam follower on said arm engaging said cam ring to effect movement of such neck mold in accordance with contour of said cam ring as said turret is rotated.

11. Apparatus for forming blown hollow articles from organic material including a series of spaced blow molds mounted to be movable in a predetermined path in succession through separate stations disposed along said path, drive means connected to effect step by step movement of said blow molds successively through said stations, a body mold mounted spaced from but adjacent said predetermined path of movement of said blow molds at a blank mold station, a neck mold and a core plunger operatively associated with each of said blow molds, a blowhead to blow mold articles from plastic blanks in said blow molds and neck molds, means mounting each of said neck molds and its associated core plunger to be movable with its associated blow mold in said predetermined path and depart therefrom at said blank mold station, guide means extending along at least the portion of said path adjacent said blank mold station and stationarily mounted with respect to said blow molds and neck molds to be engaged by each of said mounting means for said neck molds and core plungers, said mounting means of each neck mold and associated core plunger engaging said guide means as each neck mold and associated core plunger passes to and from said blank mold station to cause each neck mold and associated core plunger to depart from and return to said predetermined path at said blank mold station, each said neck mold and associated core plunger during departure from said path at said blank mold station moving into cooperation with said body mold to form therewith a blank mold, means for introducing plastic material into said blank mold to form a blank therewithin about the plunger for subsequent transfer to a blow mold upon movement of said blow molds along said path, and means for elongating the plungers and stretching the blanks thereon.

References Cited in the file of this patent

UNITED STATES PATENTS

| | | |
|---|---|---|
| 687,595 | Blue | Nov. 26, 1901 |
| 738,657 | Buttler | Sept. 8, 1903 |
| 806,669 | Hill | Dec. 5, 1905 |
| 1,601,836 | Stenhouse | Oct. 5, 1926 |
| 1,982,103 | Hiller | Nov. 27, 1934 |
| 2,290,129 | Moreland | July 14, 1942 |
| 2,331,687 | Hobson | Oct. 12, 1943 |
| 2,331,702 | Kopitke | Oct. 12, 1943 |
| 2,715,751 | Weber | Aug. 23, 1955 |